US007077377B2

(12) United States Patent
Schürz

(10) Patent No.: US 7,077,377 B2
(45) Date of Patent: Jul. 18, 2006

(54) DEVICE FOR THE TRANSLATION OF A DISPLACEMENT OF AN ACTUATOR, IN PARTICULAR FOR AN INJECTION VALVE

(75) Inventor: Willibald Schürz, Pielenhofen (DE)

(73) Assignee: Siemens Aktiengesellschaft, Munich (DE)

( * ) Notice: Subject to any disclaimer, the term of this patent is extended or adjusted under 35 U.S.C. 154(b) by 211 days.

(21) Appl. No.: 10/864,037

(22) Filed: Jun. 9, 2004

(65) Prior Publication Data

US 2004/0237519 A1 Dec. 2, 2004

Related U.S. Application Data

(63) Continuation of application No. PCT/DE02/04465, filed on Dec. 5, 2002.

(30) Foreign Application Priority Data

Dec. 17, 2001 (DE) ................................ 101 62 045

(51) Int. Cl.
*F16K 31/12* (2006.01)

(52) U.S. Cl. .......................................... 251/54; 251/57

(58) Field of Classification Search .................. 251/54, 251/57

See application file for complete search history.

(56) References Cited

U.S. PATENT DOCUMENTS

| | | | | | |
|---|---|---|---|---|---|
| 4,560,871 | A | * | 12/1985 | Bowman et al. | 251/57 |
| 4,803,393 | A | * | 2/1989 | Takahashi | 123/478 |
| 4,858,439 | A | * | 8/1989 | Sawada et al. | 239/102.2 |
| 6,062,532 | A | * | 5/2000 | Gurich et al. | 251/57 |
| 6,076,800 | A | * | 6/2000 | Heinz et al. | 251/57 |
| 6,142,443 | A | * | 11/2000 | Potschin et al. | 251/57 |
| 6,290,204 | B1 | * | 9/2001 | Kienzler et al. | 251/54 |
| 6,427,968 | B1 | * | 8/2002 | Stoecklein | 251/57 |
| 6,460,779 | B1 | * | 10/2002 | Boecking | 251/57 |
| 6,843,464 | B1 | * | 1/2005 | Stoecklein et al. | 251/57 |
| 2002/0134954 | A1 | | 9/2002 | Kienzler et al. | 251/57 |

FOREIGN PATENT DOCUMENTS

| | | | |
|---|---|---|---|
| DE | 199 50 760 | A1 | 4/2001 |
| DE | 100 02 270 | C1 | 6/2001 |
| DE | 100 46 323 | A1 | 4/2002 |
| EP | 1 111 230 | A2 | 12/2000 |

* cited by examiner

*Primary Examiner*—John Bastianelli
(74) *Attorney, Agent, or Firm*—Baker Botts L.L.P.

(57) ABSTRACT

A device, for the translation of a displacement of an actuator, in particular for an injection valve, essentially comprises two counter-displaceable pistons, coupled together by means of a translational chamber in a play-free manner. The translation chamber is filled with a translation medium and is connected to an equalization chamber by means of a sealing gap. The sealing gap only equalizes pressure differences between the translation chamber and the equalization chamber which are of long duration. One of the two pistons is pre-tensioned in a starting position by means of an externally arranged spring. A reduction in the dead volume between the pistons is possible as a result of the arrangement of the spring outside the piston.

20 Claims, 1 Drawing Sheet

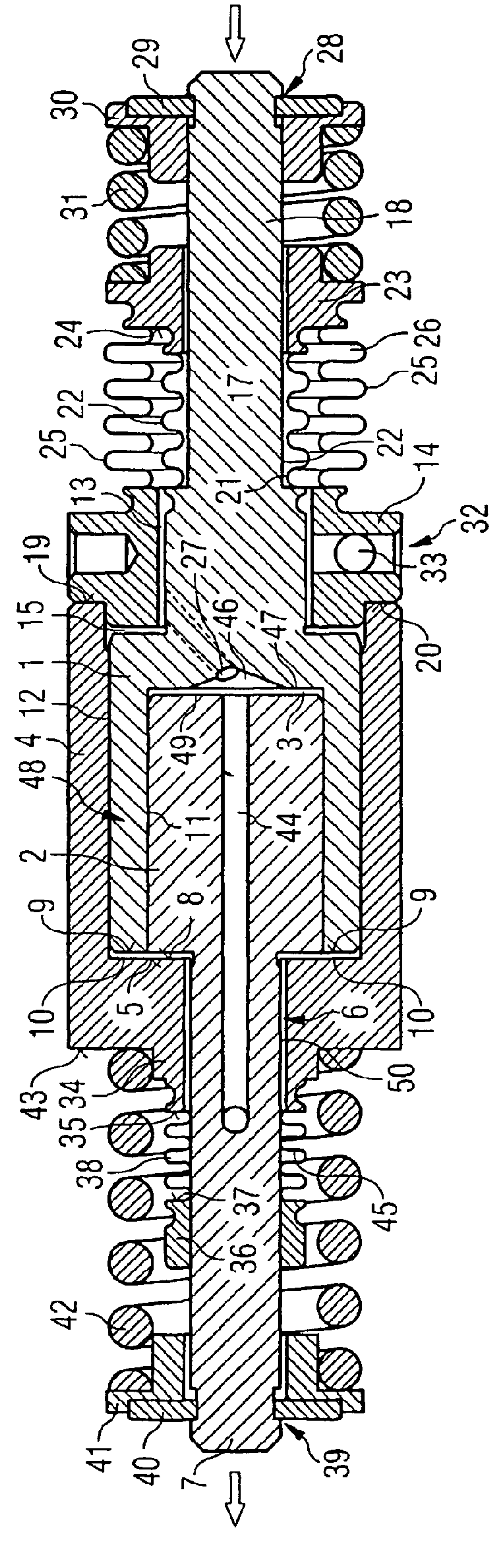
29
28
30
31
18
23
24
26
25
17
22
25
22
21
14
13
32
19
27
33
46
15
47
20
1
12
49
3
4
48
11
44
2
8
9
9
5
10
6
10
50
43
34
35
38
37
45
36
42
41
40
7
39

DEVICE FOR THE TRANSLATION OF A DISPLACEMENT OF AN ACTUATOR, IN PARTICULAR FOR AN INJECTION VALVE

CROSS REFERENCE TO RELATED APPLICATION

This application is a continuation of copending International Application No. PCT/DE02/04465 filed Dec. 5, 2002 which designates the United States, and claims priority to German application no. 101 62 045.4 filed Dec. 17, 2001.

TECHNICAL FIELD OF THE INVENTION

The invention relates to a device for the translation of a displacement of an actuator.

DESCRIPTION OF THE RELATED ART

Injection valves such as piezoelectrically operated injection valves use an actuator with a relatively small control displacement. So that an injection needle or a servo valve for controlling an injection needle can be correctly actuated despite the small displacement of the piezoelectric actuator, it is necessary to translate the displacement of the actuator. Appropriate translation devices are used for this translation.

A hydraulic device for the translation of an actuator displacement is known from document DE 19 962 177 A1. The device has a first piston element which is solidly connected to an actuator. A second piston element, which is connected to a control element, is also provided. A hydraulic chamber is provided between the first piston element and the second piston element. A storage chamber, which is connected to the hydraulic chamber by means of a throttle gap, is also formed. The storage chamber includes a pressurized storage chamber area, the boundaries of which are elastically formed. The area boundaries are marked by bellows arrangements which are pre-tensioned by a pre-tensioning spring opposite the housing of the injection valve. Pre-tensioning the storage chamber area creates pressure in the storage chamber, ensuring reliable filling of the hydraulic chamber.

From document DE 19 950 760 A1 there is known to be a fuel injection valve which has a piezoelectric or magnetostrictive actuator.

Between the actuator and a valve needle is a ram device provided with two reciprocating pistons moving in countermotion to one another. The ram device is hermetically sealed relative to a valve interior. The first reciprocating piston is effectively connected to the actuator and takes the form of a hollow cylinder which is open at one end and the opening of which is modified by the actuator. The second reciprocating piston is located in the cylinder opening. The first reciprocating piston itself is located in a hollow, cylindrical housing. A translation chamber is formed between one end surface of the housing and the first and second pistons. The second piston is effectively connected to an injection needle. A piston chamber is formed between the first piston and the second piston. A second bellows is fastened in leak-proof fashion around the housing and a piston rod from the second piston, thereby forming a first pressure chamber. In the same way a first bellows is fastened in leak-proof fashion around the housing and the first piston, thereby forming a second pressure chamber. The piston chamber is connected to the first and second pressure chambers by means of openings. Located in the piston chamber is a tensioning spring which pre-tensions the first and second pistons in opposing directions. The disclosed injection valve is relatively large due to the arrangement of the tensioning spring. Moreover the piston chamber has a relatively large dead volume. The dead volume gives rise to a restriction in the motional dynamics of the first and second pistons.

Due to an unpublished patent application submitted by the applicant, with the title "Geschlossenes Hydrauliksystem" ("Closed hydraulic system") and the file number 10046323.1, a device for the translation of a displacement of an actuator is known. In this arrangement also, a tensioning element is arranged in the piston chamber between a first and a second piston. The dead volume in the piston chamber is relatively large in this embodiment also. The relatively large dead volume gives rise to adverse effects on the motional dynamics of the first and second pistons.

SUMMARY OF THE INVENTION

The object of the invention is to provide a device for the translation of a displacement of an actuator, comprising a small amount of dead volume in the piston chamber.

The object of the invention can be achieved by a device for the translation of a displacement of an actuator, in particular for an injection valve, comprising a housing, wherein a first and a second piston are held in a movable fashion, the first piston, the second piston and the housing form the boundaries of a translation chamber, the translation chamber is filled with translation medium and the position of the first piston determines the position of the second piston, the translation chamber is connected to an equalisation chamber by means of a hydraulic line, the hydraulic line equalises only pressure differences of long duration between the equalisation chamber and the translation chamber, the equalisation chamber is bounded by a first and/or second bellows, a sealing gap is formed between the housing and the second piston and is sealed by means of a third bellows, a means of tensioning is provided and this pre-tensions the second piston in a rest position, and wherein the means of tensioning is fitted in the form of a tensioning spring between the housing and the second piston.

The object can also be achieved by a device for the translation of a displacement of an actuator comprising a housing, a first and a second piston which are held in a movable fashion wherein the position of the first piston determines the position of the second piston and which form together with the housing the boundaries of a translation chamber, a translation medium which fills the translation chamber which is connected to an equalisation chamber by means of a hydraulic line, wherein the hydraulic line equalises only pressure differences of long duration between the equalisation chamber and the translation chamber, wherein the equalisation chamber is bounded by a first and/or second bellows, a sealing gap formed between the housing and the second piston which is sealed by means of a third bellows, and a means of tensioning which pre-tensions the second piston in a rest position, wherein the means of tensioning is fitted in the form of a tensioning spring between the housing and the second piston.

The housing may have a first chamber with an end wall. The first piston can be located in the piston chamber. The first piston may have a second piston chamber. The second piston may be located in the second piston chamber. A drill hole can be formed in the end wall of the housing, through which a piston rod of the second piston is fed. The translation chamber can be formed between the end wall of the housing and two working faces of the first and second pistons. The first and second pistons may form the boundaries of a further chamber, and the further chamber can be connected to the equalisation chamber by means of a hydraulic line. The tensioning spring may lie on a bearing surface of the housing, a supporting ring can be provided and can be attached to the piston rod, and the tensioning spring can be fixed between the supporting ring and the housing. The supporting ring can be in the form of a sleeve with a supporting rim, and the supporting ring can be connected to the piston rod by means of a safety ring. A second tensioning spring can be provided, and the second tensioning spring can be fixed between the housing and a piston rod of the first piston. A second tensioning spring can be provided, and the second tensioning spring can be fixed between the first and second bellows and the piston rod of the first piston. The first and the second bellows can be connected to a sleeve-shaped connecting ring. The connecting ring may have a surrounding bearing edge opposite the connection side of the first and second bellows. The second tensioning spring may rest on the said bearing edge. A second supporting ring can be in the form of a sleeve with a supporting rim, and the second supporting ring can be connected to the piston rod of the first piston by means of a safety ring. The first piston chamber of the housing in the open area may have a surrounding edge area. On the edge area a ring can be fastened all the way round in leak-proof fashion. The first bellows can be welded to an edge area all the way round in leak-proof fashion by means of the ring. The second edge area of the first bellows can be connected to a connecting ring. The second bellows can be connected all the way round in leak-proof fashion to the second piston by means of a first edge area, and the second edge area of the second bellows can be connected to the connecting ring. The ring may have a sealable drill hole for filling the equalisation chamber. The second piston may have a drill hole running from a front end which forms the boundary of the piston chamber to the area which houses the third bellows for closing a third sealing gap formed between the second piston and the housing.

One advantage of the invention stems from the fact that the dead volume in the piston chamber is reduced. The advantage of the invention is achieved in that the tensioning element for pre-tensioning the second piston is arranged outside the piston chamber. Since the tensioning element is arranged outside the piston chamber, the piston chamber can be significantly smaller. Due to the smaller piston chamber, altogether greater dynamics are achieved in the translation of the motion of the first piston and on the second piston.

In a preferred embodiment of the invention the means of tensioning provided is a tensioning spring that is fixed between the housing and a supporting ring. The supporting ring is fastened to a piston rod of the second piston. The arrangement of a supporting ring provides a simple and reliable bearing surface for the tensioning spring.

Preferably the supporting ring takes the form of a sleeve in which a supporting rim is formed. The tensioning spring grips the supporting rim. The supporting ring is connected to the piston rod by means of a locking plate. Using a sleeve-shaped supporting ring prevents the tensioning spring from becoming misshapen. In addition the fashioning of a supporting rim provides a secure bearing surface for the tensioning spring. Furthermore the use of a locking plate is a safe and simple technique for connecting the supporting ring and the piston rod. Reliable functioning of the translation device together with excellent long-term stability is thus achieved.

The preferred embodiment is provided with a second tensioning spring which is likewise arranged outside the piston chamber and is fixed between the housing and a piston rod of the first piston. Pre-tensioning of the first piston in the opposite direction to the pre-tensioning of the second piston is thus also achieved. By this means a starting position for the first piston is reliably defined. This therefore makes it among other things unnecessary for the first piston to be solidly connected to an actuator.

In a preferred embodiment the second tensioning spring is arranged outside the housing, where it is fixed between the first and second bellows and the piston rod of the first piston. By this means not only is the piston rod pre-tensioned but also a pressure is created in the equalization chamber bounded by the first and second bellows.

In a further preferred embodiment the piston chamber is hydraulically connected by means of a drill hole to a sealed area which is arranged outside the housing and preferably sealed by a bellows that is connected in leak-proof fashion around the housing and the second piston. By this means the piston chamber can be quickly emptied. In a further preferred embodiment the piston chamber is also hydraulically connected to the equalization chamber by means of a drill hole. This connection to the equalization chamber also enables the fluid to escape quickly from the piston chamber. These arrangements enable the first piston to move towards the second piston without any significant counter-force.

A further advantageous embodiment consists in sealing the housing by means of a ring, with a piston rod of the first piston passing through the opening of the ring. The said ring preferably has a sealable drill hole for filling the device with fluid. The invention will be explained in greater detail with the aid of the FIGURE.

BRIEF DESCRIPTION OF THE DRAWING

The FIGURE is a diagram of a cross-section through the device to which the invention relates for the translation of a displacement of an actuator to a control element. The translation device to which the invention relates can be used for any type of actuator and control element, but is particularly suitable for use in an injection valve, for instance for controlling a servo valve with the aid of a piezoelectric actuator.

DETAILED DESCRIPTION OF THE PREFERRED EMBODIMENTS

There is a first piston 1 in the form of a sleeve which is open at one end. The sleeve-shaped part of the piston forms a piston chamber 3 in which a second piston 2 is located. The first and second pistons 1, 2 form the boundaries of the piston chamber 3. The first piston 1 is itself located in a cylinder-shaped chamber 48 of a housing 4 which has an end surface 5 at the front end of the first piston 1. In the end surface 5 is an opening 6 through which a piston rod 7 of the second piston 2 is led. The piston rod 7 has a smaller diameter than the second piston 2. The piston rod 7 has a ring-shaped shoulder 8 and thus changes to the wider diameter of the second piston 2. A translation chamber 10 is formed between the end surface 5, the shoulder 8 and a ring-shaped front end 9 of the first piston 1. The translation chamber 10 is hydraulically connected to the piston chamber 3 by means of a first sealing gap 11 which is formed between a side wall of the second piston 2 and an inner wall of the first piston 1. The piston chamber 3 is bounded by an end surface 47 of the first piston 1 and a front end 49 of the second piston 2.

The translation chamber 10 is also connected to a further sealing gap 13 by means of a second sealing gap 12 which is formed between the outer wall of the first piston 1 and the inner wall of the housing 4. The further sealing gap 13 is formed between a sealing ring 14 and a first section 16 of a second piston rod 17. The first piston 3 has a second shoulder 15 and thus changes to the first section 16 of the second piston rod 17. The first piston 16, which is basically cylinder-shaped, has a third shoulder 21 and thus changes into a second section 18 of the second piston rod 17. The second section 18 of the second piston rod 17 is basically cylinder-shaped and has a smaller diameter than the first section 16.

All round the sealing ring 14 is a ring-shaped groove 20 which is formed in the area at the outer edge of the sealing ring 14 and is associated with a ring-shaped front end 19 of the housing 4. Preferably the internal diameter of the sealing ring 4, which is tapered due to the ring-shaped groove 20, is matched to the internal diameter of the cylinder-shaped recess of the housing 4. This ensures a good fit and therefore a good seal between the housing 4 and the sealing ring 14. The sealing ring 14 may for example be connected to the housing 4 by means of a leak-proof welding seam running all the way round.

In the area of the third shoulder 21 a first, basically sleeve-shaped bellows 22 is fastened all the way round in a leak-proof fashion by means of a first end area to the third shoulder 21. The first bellows 22 is preferably made from a metallic material and therefore preferably connected to the metallic second piston 2 in a leak-proof fashion by means of a welding seam running all the way round. A second end of the first bellows 22 is connected all the way round in a leak-proof fashion to a connecting ring 23. The second section 18 of the second piston rod 17 passes through the opening of the connecting ring 23.

The connecting ring 23 has a fourth shoulder 24, which causes the diameter of the connecting ring 23 to become larger. In the area of the fourth shoulder 24 a second, basically sleeve-shaped bellows 25 is connected all the way round in a leak-proof fashion to the connecting ring 23. The second bellows 25 is connected all the way round in a leak-proof fashion in the area of its other edge, to a front end of the sealing ring 14 turned towards the connecting ring 23. By this means an equalization chamber 26 is formed between the first and second bellows 22, 25 and the connecting ring 23.

The equalization chamber 26 is hydraulically connected to the translation chamber 10 by means of the further sealing gap 13 and the second sealing gap 12. The hydraulic connection is so designed that pressure differences between the translation chamber 10 and the equalization chamber 26 are only equalized if the pressure differences persist for a minimum length of time. The sealing gaps and the chosen geometry define the minimum time in such a way that the time needed to translate a force from the first piston to the second piston must be exceeded before pressure equalization takes place. This ensures that a force can be translated from the first piston to the second piston 1, 2 virtually without loss, whereas pressure differences which are of long duration are equalized. By this means the translation chamber 10 can be completely filled even in the presence of temperature fluctuations or wear and tear. This ensures that the translation chamber 10 is always completely filled with a translation fluid such as hydraulic oil.

A first drill hole 27, leading from the end surface 47 which forms the boundary of the piston chamber 3 to the further sealing gap 13, is formed in the first piston 1. This creates a hydraulic connection linking the equalization chamber 26 to the piston chamber 3. The said hydraulic connection enables pressure to be quickly equalized between the equalization chamber 26 and the piston chamber 3.

In the end area of the second piston rod 17 is a safety groove 28 in which a locking plate 29 is fastened. Clamped to the locking plate 29 is a second connecting ring 30. A first spring 31 is fixed between the second and first connecting rings 30, 23. The first spring 31 applies a pre-tensioning force to the first connecting ring 23 and thence to the first and second bellows 22, 25. This has the effect of pressurizing the translation fluid in the equalization chamber 26.

The sealing ring 14 has a continuous second drill hole 32. Translation fluid can be poured from outside via this second drill hole 32 into the third sealing gap 13 and the volume hydraulically connected to the third sealing gap 13 can be filled. When all volumes hydraulically connected to the third sealing gap 13 have been filled, the second drill hole 32 is closed by means of a closure 33. In the typical embodiment shown the closure 33 is in the form of a sphere.

The housing 4 is tapered in its external diameter in the area of the first piston rod 7 by means of a shoulder on a ring-shaped part 34 with a smaller external diameter. The ring-shaped part 34 surrounds the first piston rod 7. The first piston rod 7 extends a predetermined distance towards the ring-shaped part 34. The ring-shaped part 34 has a ring-shaped, second front end 35 which basically is arranged vertically to the lengthways direction of the first piston rod 7. At a predetermined distance from the ring-shaped part 34 is a third sealing ring 36 connected all the way round in a leak-proof fashion to the piston rod 7. The third sealing ring 36 has a ring-shaped, third front end 37 which is turned towards the ring-shaped part 34. Between the ring-shaped part 34 and the third sealing ring 36 is a third bellows 38 which is basically designed in the form of a cylinder and fastened all the way round in a leak-proof fashion by means of an end area to the second front end of the ring-shaped part 34 and by means of the other end area to the third front end 37 of the third sealing ring 36. By this means a third sealing gap 50, which is formed between the housing 4 and the piston rod 7 and connected to the translation chamber 10, is reliably sealed.

In the end area of the piston rod 7 is a second safety groove 39 in which a second locking plate 40 is fixed. A fourth connecting ring 41 is clamped to an inner side of the second locking plate 40, which is turned towards the housing 4. A second spring 42 is fixed between the fourth connecting ring 41 and the housing 4. The second spring 42 lies on a fourth front end 43 of the housing 4, formed by the shoulder of the housing 4, in which the housing 4 changes from a fairly large external diameter to the ring-shaped part 34 with a smaller external diameter.

The second piston 2 has a third drill hole 44 created centrally at the front end 49 of the second piston 2, going from the front end 49 to the piston rod 7 in an area at the edge of the piston rod 7, and arranged at the same height as the third bellows 38. This creates a hydraulic link between the piston chamber 3 and an equalization chamber 45 bounded by the piston rod 7 and the third bellows 38. In a simple embodiment the piston chamber is in the form of a blind hole boring with a centrally drilled blind hole 46. The blind hole 46 is hydraulically connected to the third sealing gap 13 via the first drill hole 27.

The translation device to which the figure relates works as follows: The volumes which are formed in the translation device and hydraulically connected to the translation chamber 10 are completely filled with a fluid medium which is preferably incompressible. In a rest position the first piston 1 is held in a starting position with pre-tensioning by the first spring 31. The starting position may be set for instance by positioning the first piston with the second shoulder 15 at the connecting ring 14. The second piston 2 is at rest in a starting position in which the second piston 2 is pre-tensioned by the second spring 42. The rest position may be determined for instance by positioning the second piston 2 with the shoulder 8 at the end surface 5 of the housing 4. The piston rods 7, 17 of the first and second pistons 1, 2 are pre-tensioned in the opposite direction in the rest position of the housing 4. The volume formed between the pistons 1, 2 and the housing 4, and between the bellows 22, 25, and between the third bellows 38 and the piston rod 7, is filled with a translation medium, in particular a hydraulic fluid. Filling takes place via the second drill hole 32, which is then closed with the aid of the closure 33. Due to the pre-tensioning of the equalization chamber 26 via the first spring 31 a specific pressure is present in the transmission medium even in the idle state. The idle state of the first and the second piston is preferably also defined in that the first and the second piston rods 7, 17 are clamped to an actuator or to a control element, giving a play-free effective connection between the actuator and the control element.

The actuator may be designed as a piezoelectric actuator for example. If the actuator is then activated, it moves the first piston 1 in the direction of the housing 4. Due to the hydraulic coupling of the second piston 2 to the first piston 1 via the translation chamber 10, the second piston 2 and the piston rod 7 of the second piston 2 are likewise moved away from the housing, counter to the direction of movement of the first piston 1. If the piston rod 7 is effectively connected to an injection needle, then the movement of the piston rod 7 may be made to raise the injection needle from a leak-proof seating so that fuel can be injected into an internal combustion engine. In another typical embodiment a servo valve is opened or closed by the action of the second piston so that a pressure change can affect an injection needle and cause the injection needle to be lifted from a leak-proof seating.

If the supply of current to the actuator is interrupted, no further force acts upon the second piston rod 17 of the first piston 1. Consequently the second piston rod 17 of the first piston 1 is moved away from the housing 4 by the pre-tensioning force of the first spring 31. Likewise the second piston 2 is moved back to the starting position by the second spring 42.

On the one hand this approach ensures that the displacement of the first piston is reliably translated into a corresponding displacement of the second piston in the opposite direction, and on the other hand it ensures reliable positioning of the first and the second piston rods on an actuator or on a control element. Positioning is ensured in that appropriate spring media 31, 42 are provided and in that activation of the actuator is immediately translated into a corresponding activation of the second piston, since the translation chamber 10 is always reliably filled with translation medium.

Because of the arrangement of the second spring 42 outside the housing 4 and in particular outside the piston chamber 3, the volume in the piston chamber 3 can be kept low. Due to the low volume of the piston chamber 3 the total volume filled with translation medium is reduced. Superfluous dead volume in the translation device is thereby reduced. The function of the translation device is thus improved.

Preferably the translation medium in the equalization chamber 26 is pressurized by means of the arrangement of the first spring 31. This ensures that the translation chamber 10 is securely and quickly filled with translation medium. This in turn reliably ensures a play-free coupling between the first and the second pistons 1, 2 and a corresponding actuator or control element. Since the first spring 31 is coupled to the piston rod 17 of the first piston 1, the pressure in the equalization chamber 26 is increased when the first piston 1 is activated by the actuator. This causes the total external pressure on the translation chamber 10 to be increased when the translation device is activated, so that the escape of translation medium from the translation chamber 10 is impeded. This has the advantage that the sealing gaps which the translation chamber 10 connects to the other translation medium volumes need not be sealed so precisely in order to prevent a transient escape of translation medium from the translation chamber. The translation device thus becomes more cost-effective to manufacture.

I claim:

1. A device for the translation of a displacement of an actuator comprising a housing, wherein a first and a second piston are held in a movable fashion, the first piston, the second piston and the housing form the boundaries of a translation chamber, the translation chamber is filled with translation medium and the position of the first piston determines the position of the second piston, the translation chamber is connected to an equalisation chamber by means of a hydraulic line, the hydraulic line equalises only pressure differences of long duration between the equalisation chamber and the translation chamber, the equalisation chamber is bounded by a first and/or second bellows, a sealing gap is formed between the housing and the second piston and is sealed by means of a third bellows, a means of tensioning is provided and this pre-tensions the second piston in a rest position, and wherein the means of tensioning is fitted in the form of a tensioning spring between the housing and the second piston.

2. The device according to claim 1, wherein the housing has a first piston chamber with an end wall, the first piston is located in the first piston chamber, the first piston has a second piston chamber, the second piston is located in the second piston chamber, a drill hole is formed in the end wall of the housing, through which a piston rod of the second piston is fed, the translation chamber is formed between the end wall of the housing and two working faces of the first and second pistons, the first and second pistons form the boundaries of a further chamber, and wherein the further chamber is connected to the equalisation chamber by means of a hydraulic line.

3. The device according to claim 1, wherein the tensioning spring lies on a bearing surface of the housing, a supporting ring is provided and is attached to the piston rod, and wherein the tensioning spring is fixed between the supporting ring and the housing.

4. The device according to claim 3, wherein the supporting ring is in the form of a sleeve with a supporting rim, and the supporting ring is connected to the piston rod by means of a safety ring.

5. The device according to claim 1, wherein a second tensioning spring is provided, and the second tensioning spring is fixed between the housing and a piston rod of the first piston.

6. The device according to claim 1, wherein a second tensioning spring is provided, and the second tensioning spring is fixed between the first and second bellows and the piston rod of the first piston.

7. The device according to claim 1, wherein
the first and the second bellows are connected to a sleeve-shaped connecting ring,
the connecting ring has a surrounding bearing edge opposite the connection side of the first and second bellows,
the second tensioning spring rests on the said bearing edge,
a second supporting ring is in the form of a sleeve with a supporting rim, and wherein
the second supporting ring is connected to the piston rod of the first piston by means of a safety ring.

8. The device according to claim 1, wherein
the first piston chamber of the housing in the open area has a surrounding edge area,
on the edge area a ring is fastened all the way round in leak-proof fashion,
the first bellows is welded to an edge area all the way round in leak-proof fashion by means of the ring,
the second edge area of the first bellows is connected to a connecting ring,
the second bellows is connected all the way round in leak-proof fashion to the second piston by means of a first edge area, and wherein
the second edge area of the second bellows is connected to the connecting ring.

9. The device according to claim 8, wherein the ring has a sealable drill hole for filling the equalisation chamber.

10. The device according to claim 1, wherein the second piston has a drill hole running from a front end which forms the boundary of the piston chamber to the area which houses the third bellows for closing a third sealing gap formed between the second piston and the housing.

11. A device for the translation of a displacement of an actuator comprising:
a housing,
a first and a second piston which are held in a movable fashion wherein the position of the first piston determines the position of the second piston and which form together with the housing the boundaries of a translation chamber,
a translation medium which fills the translation chamber which is connected to an equalisation chamber by means of a hydraulic line, wherein the hydraulic line equalises only pressure differences of long duration between the equalisation chamber and the translation chamber, wherein the equalisation chamber is bounded by a first and/or second bellows,
a sealing gap formed between the housing and the second piston which is sealed by means of a third bellows, and
a means of tensioning which pre-tensions the second piston in a rest position, wherein
the means of tensioning is fitted in the form of a tensioning spring between the housing and the second piston.

12. The device according to claim 11, wherein
the housing has a first piston chamber with an end wall,
the first piston is located in the first piston chamber,
the first piston has a second piston chamber,
the second piston is located in the second piston chamber,
a drill hole is formed in the end wall of the housing, through which a piston rod of the second piston is fed,
the translation chamber is formed between the end wall of the housing and two working faces of the first and second pistons,
the first and second pistons form the boundaries of a further chamber, and wherein
the further chamber is connected to the equalisation chamber by means of a hydraulic line.

13. The device according to claim 11, wherein the tensioning spring lies on a bearing surface of the housing, a supporting ring is provided and is attached to the piston rod, and wherein the tensioning spring is fixed between the supporting ring and the housing.

14. The device according to claim 13, wherein the supporting ring is in the form of a sleeve with a supporting rim, and the supporting ring is connected to the piston rod by means of a safety ring.

15. The device according to claim 11, wherein a second tensioning spring is provided, and the second tensioning spring is fixed between the housing and a piston rod of the first piston.

16. The device according to claim 11, wherein a second tensioning spring is provided, and the second tensioning spring is fixed between the first and second bellows and the piston rod of the first piston.

17. The device according to claim 11, wherein
the first and the second bellows are connected to a sleeve-shaped connecting ring,
the connecting ring has a surrounding bearing edge opposite the connection side of the first and second bellows,
the second tensioning spring rests on the said bearing edge,
a second supporting ring is in the form of a sleeve with a supporting rim, and wherein
the second supporting ring is connected to the piston rod of the first piston by means of a safety ring.

18. The device according to claim 11, wherein
the first piston chamber of the housing in the open area has a surrounding edge area,
on the edge area a ring is fastened all the way round in leak-proof fashion,
the first bellows is welded to an edge area all the way round in leak-proof fashion by means of the ring,
the second edge area of the first bellows is connected to a connecting ring,
the second bellows is connected all the way round in leak-proof fashion to the second piston by means of a first edge area, and wherein
the second edge area of the second bellows is connected to the connecting ring.

19. The device according to claim 18, wherein the ring has a sealable drill hole for filling the equalisation chamber.

20. The device according to claim 11, wherein the second piston has a drill hole running from a front end which forms the boundary of the piston chamber to the area which houses the third bellows for closing a third sealing gap formed between the second piston and the housing.

* * * * *